United States Patent
Kim et al.

(10) Patent No.: US 10,421,391 B2
(45) Date of Patent: Sep. 24, 2019

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventors: Cheolmun Kim, Seoul (KR); Sanghyuk Lee, Seoul (KR); Kihoon Han, Seoul (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 15/672,882

(22) Filed: Aug. 9, 2017

(65) Prior Publication Data

US 2018/0043819 A1 Feb. 15, 2018

(30) Foreign Application Priority Data

Aug. 9, 2016 (KR) .................. 10-2016-0101386

(51) Int. Cl.
| | |
|---|---|
| *B60Q 1/00* | (2006.01) |
| *B60Q 1/02* | (2006.01) |
| *B60Q 1/16* | (2006.01) |
| *B60Q 1/22* | (2006.01) |
| *B60Q 1/24* | (2006.01) |
| *B60Q 1/08* | (2006.01) |
| *B60Q 1/12* | (2006.01) |

(Continued)

(52) U.S. Cl.
CPC .............. *B60Q 1/085* (2013.01); *B60Q 1/12* (2013.01); *B60Q 1/143* (2013.01); *B60Q 1/16* (2013.01); *B60Q 1/22* (2013.01); *B60Q 1/24* (2013.01); *B60Q 1/346* (2013.01); *B60Q 1/48* (2013.01); *B60Q 2300/33* (2013.01)

(58) Field of Classification Search
None
See application file for complete search history.

(56) References Cited

U.S. PATENT DOCUMENTS

| | | | |
|---|---|---|---|
| 7,385,488 B2 * | 6/2008 | Kim .................. | B60R 1/12 340/435 |
| 2013/0058116 A1 * | 3/2013 | Galbas ............... | B60Q 1/085 362/512 |

(Continued)

FOREIGN PATENT DOCUMENTS

| | | |
|---|---|---|
| DE | 102004003296 | 1/2005 |
| DE | 102010010622 | 9/2011 |

(Continued)

OTHER PUBLICATIONS

Extended European Search Report in European Application No. 17185072.0, dated Nov. 16, 2017, 10 pages (with English translation).

*Primary Examiner* — Adam D Tissot
(74) *Attorney, Agent, or Firm* — Fish & Richardson P.C.

(57) ABSTRACT

A vehicle control device includes a plurality of lamps provided on a vehicle; a sensing unit configured to sense information related to the vehicle; and at least one processor. The at least one processor is configured to, based on a determination, through the sensing unit, that at least a portion of the vehicle has entered a first area that is adjacent to an available parking space, activate, in a first illumination mode, at least one lamp among the plurality of lamps that has entered the first area that is adjacent to the available parking space.

20 Claims, 17 Drawing Sheets

(51) Int. Cl.
*B60Q 1/14* (2006.01)
*B60Q 1/34* (2006.01)
*B60Q 1/48* (2006.01)

(56) References Cited

U.S. PATENT DOCUMENTS

| | | |
|---|---|---|
| 2014/0214260 A1 | 7/2014 | Eckert et al. |
| 2016/0016505 A1 | 1/2016 | Yin et al. |
| 2017/0106793 A1* | 4/2017 | Kumar .................. B60Q 1/085 |

FOREIGN PATENT DOCUMENTS

| | | |
|---|---|---|
| DE | 102012015618 | 2/2014 |
| DE | 102013213064 | 1/2015 |
| JP | 2006311214 | 11/2006 |
| KR | 10-2005-0026194 | 3/2005 |
| KR | 101583998 | 1/2016 |
| KR | 10-2016-0047091 | 5/2016 |

* cited by examiner

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date and the right of priority to Korean Patent Application No. 10-2016-0101386, filed on Aug. 9, 2016, the contents of which are incorporated by reference herein in its entirety.

TECHNICAL FIELD

This disclosure generally relates to a vehicle control device mounted on a vehicle and a method for controlling the vehicle.

BACKGROUND

A vehicle is generally an apparatus that transports a user in a desired direction. A typical example of a vehicle is a car.

For convenience of users of a vehicle, various types of sensors and electronic devices are typically provided in a vehicle. For example, some vehicles implement an Advanced Driver Assistance System (ADAS) that utilizes data from sensors to improve convenience and safety of users of a vehicle. As another example, some vehicles are configured as an autonomous vehicle that autonomously performs one or more driving operations.

A vehicle is often provided with various types of lamps. For example, a vehicle typically includes vehicle lamps that perform various functions, such as performing an illumination function to facilitate viewing objects near the vehicle during driving at night, performing a signaling function that notifies those outside the vehicle of a driving state of the vehicle, and other functions.

Vehicle lamps include devices that directly emit light using lamps, such as a head lamp emitting light to a front side to facilitate a driver's view, a brake lamp that activates when operating the brake of a vehicle, or turn indicator lamps that activate upon a left turn or a right turn of the vehicle.

As another example, vehicle lamps may also include reflectors that reflect light to facilitate those outside the vehicle to recognize the vehicle from outside. Such reflectors are typically mounted on front and rear sides of the vehicle.

In some scenarios, the installation criteria and operation standards of vehicle lamps are regulated by one or more criteria, such as those specified by manufacturing, legal, or regulatory standards.

SUMMARY

Implementations disclosed herein provide a control device for a vehicle that is configured to control one or more lamps of the vehicle in an improved manner for parking the vehicle.

In one aspect, a vehicle control device may include a plurality of lamps provided on a vehicle; a sensing unit configured to sense information related to the vehicle; and at least one processor. The at least one processor may be configured to, based on a determination, through the sensing unit, that at least a portion of the vehicle has entered a first area that is adjacent to an available parking space, activate, in a first illumination mode, at least one lamp among the plurality of lamps that has entered the first area that is adjacent to the available parking space.

In some implementations, the plurality of lamps may be provided at different positions of the vehicle, and the at least one processor may be configured to activate, in the first illumination mode, the at least one lamp that has entered the first area by activating, in the first illumination mode, two or more lamps among the plurality of lamps in an order in which the two or more lamps have entered the first area adjacent to the available parking space.

In some implementations, the at least one processor may be further configured to maintain the at least one lamp in the first illumination mode after the at least one lamp has passed through the first area and has entered the available parking space.

In some implementations, the first illumination mode may include turning on the at least one lamp in a continuous manner.

In some implementations, the first area that is adjacent to the available parking space may include a region that is within a first distance from at least one boundary of the available parking space.

In some implementations, the at least one processor may be further configured to: based on at least one first lamp among the plurality of lamps having entered the first area, and based on at least one second lamp among the plurality of lamps not having entered the first area, activate the at least one first lamp in the first illumination mode, and activate the at least one second lamp in a second illumination mode different from the first illumination mode.

In some implementations, the at least one processor may be further configured to: based on at least one first lamp among the plurality of lamps having entered the first area, activate at least one first lamp in the first illumination mode according to a direction in which the vehicle enters the available parking space.

In some implementations, the at least one processor may be configured to activate the at least one first lamp in the first illumination mode according to the direction in which the vehicle enters the available parking space by continuously turning on the at least one first lamp that is provided on a front side of the vehicle based on the vehicle entering the first area adjacent to the available parking space in a forward direction starting with the front side of the vehicle; and continuously turning on the at least one first lamp that is provided on a rear side of the vehicle based on the vehicle entering the first area adjacent to the available parking space in a reverse direction starting from the rear side of the vehicle.

In some implementations, the at least one processor may be configured to activate the at least one first lamp in the first illumination mode according to the direction in which the vehicle enters the available parking space by continuously turning on the at least one lamp that is provided on a first side of the vehicle that is closest to the parking space among a plurality of sides of the vehicle, based on the vehicle executing a parallel parking operation into the available parking space.

In some implementations, the at least one processor may be further configured to, based on the vehicle executing the parallel parking operation into the available parking space, continuously turn on at least one second lamp that has not yet entered the first area adjacent to the available parking area, the at least one second lamp provided on the first side of the vehicle that is closest to the parking space.

In some implementations, at least one of the plurality of lamps may be configured to vary a light output direction, and the at least one processor may be further configured to control the light output direction of the at least one of the plurality of lamps to be directed to a center location of the available parking space, based on the at least one of the plurality of lamps being activated in the first illumination mode.

In some implementations, the at least one processor may be further configured to: sense, through the sensing unit, whether a first object is present within a first distance from the vehicle; based on a first determination that the first object is present within the first distance from the vehicle, control the plurality of lamps in a first control mode; and based on a second determination that the first object is not present within the first distance from the vehicle, control the plurality of lamps in a second control mode.

In some implementations, the at least one processor may be configured to, based on the first determination that the first object is present within the first distance from the vehicle, control the plurality of lamps in the first control mode by turning on all of the plurality of lamps in the first illumination mode. The at least one processor may also be configured to, based on the second determination that the first object is not present within the first distance from the vehicle, control the plurality of lamps in the second control mode by turning on, in the first illumination mode, only a subset of the plurality of lamps that has entered the first area adjacent to the available parking space.

In some implementations, the at least one processor may be further configured to: sense, through the sensing unit, whether a first object is present within the available parking space or is present adjacent to the available parking space; based on a first determination that the first object is present within the available parking space or is present adjacent to the available parking space, activate, in the first illumination mode, at least one lamp that has entered the first area adjacent to the available parking space; and based on a second determination that the first object is not present within the available parking space and is not present adjacent to the available parking space, not activate, in the first illumination mode, the at least one lamp that has entered the first area adjacent to the available parking space.

In another aspect, a vehicle may include the vehicle control device according to one or more of the implementations described above.

In another aspect, a method for controlling a vehicle having a plurality of lamps may include: sensing that at least a portion of the vehicle has entered a first area that is adjacent to an available parking space; and based on sensing that at least the portion of the vehicle has entered the first area adjacent to the available parking space, activating, in a first illumination mode, at least one lamp among the plurality of lamps that has entered the first area that is adjacent to the available parking space.

In some implementations, the plurality of lamps may be provided at different positions of the vehicle, and activating, in the first illumination mode, the at least one lamp that has entered the first area may include: activating, in the first illumination mode, two or more lamps among the plurality of lamps in an order in which the two or more lamps have entered the first area adjacent to the available parking space.

In some implementations, the method may further include: maintaining the at least one lamp in the first illumination mode after the at least one lamp has passed through the first area and has entered the available parking space.

In some implementations, the first illumination mode may include turning on the at least one lamp in a continuous manner.

In some implementations, the first area that is adjacent to the available parking space may include a region that is within a first distance from at least one boundary of the available parking space.

Further scope of applicability of the present disclosure will become more apparent from the detailed description given hereinafter. However, the detailed description and specific examples are given by way of illustration only, and various changes and modifications within the spirit and scope of the disclosure may be made.

DETAILED DESCRIPTION

Figure 1:
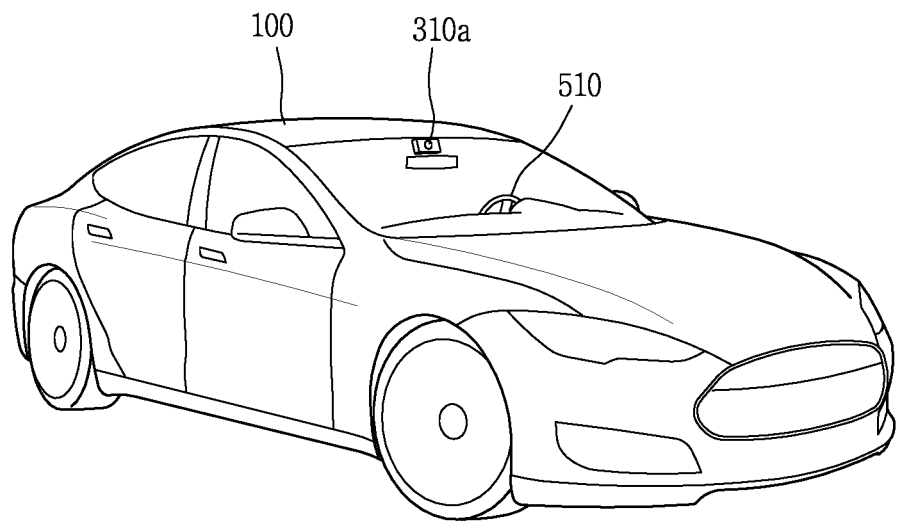
FIG. 1 is a diagram illustrating an example of a vehicle in accordance with some implementations.
Figure 1:
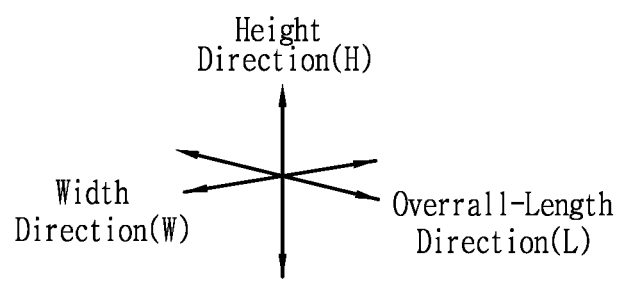
Figure 2:
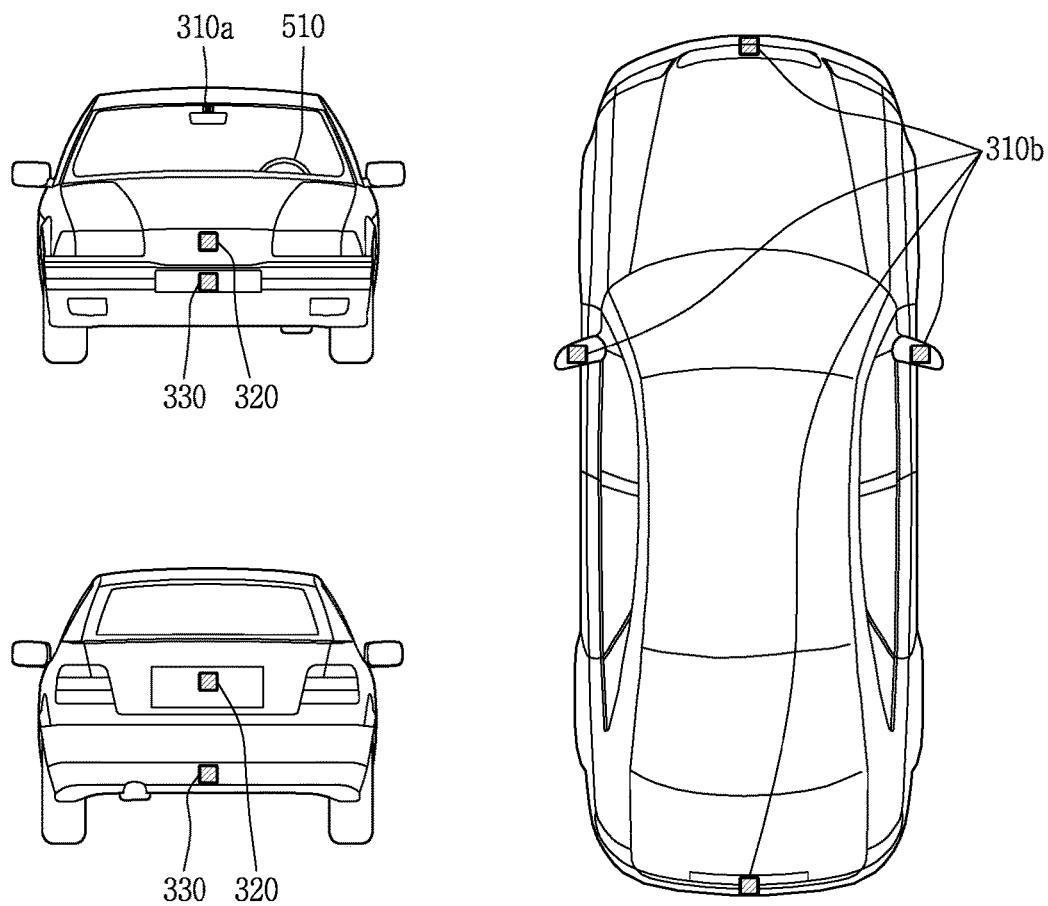
FIG. 2 is a diagram illustrating an example of a vehicle viewed from various angles in accordance with some implementations.
Figure 3:
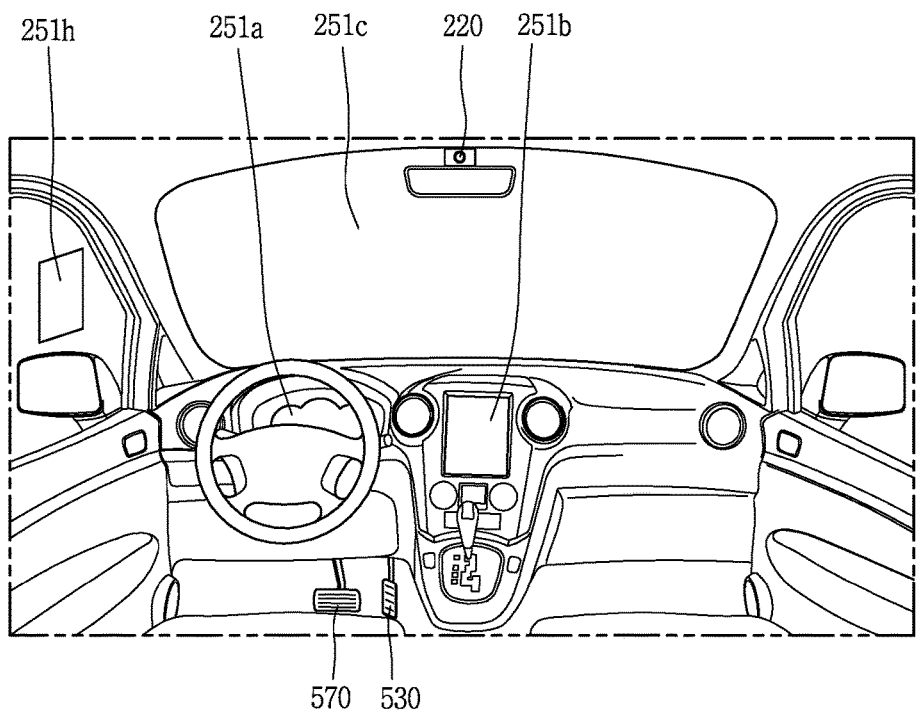
FIGS. 3 and 4 are diagrams illustrating examples of an interior of a vehicle in accordance with some implementations.
Figure 4:
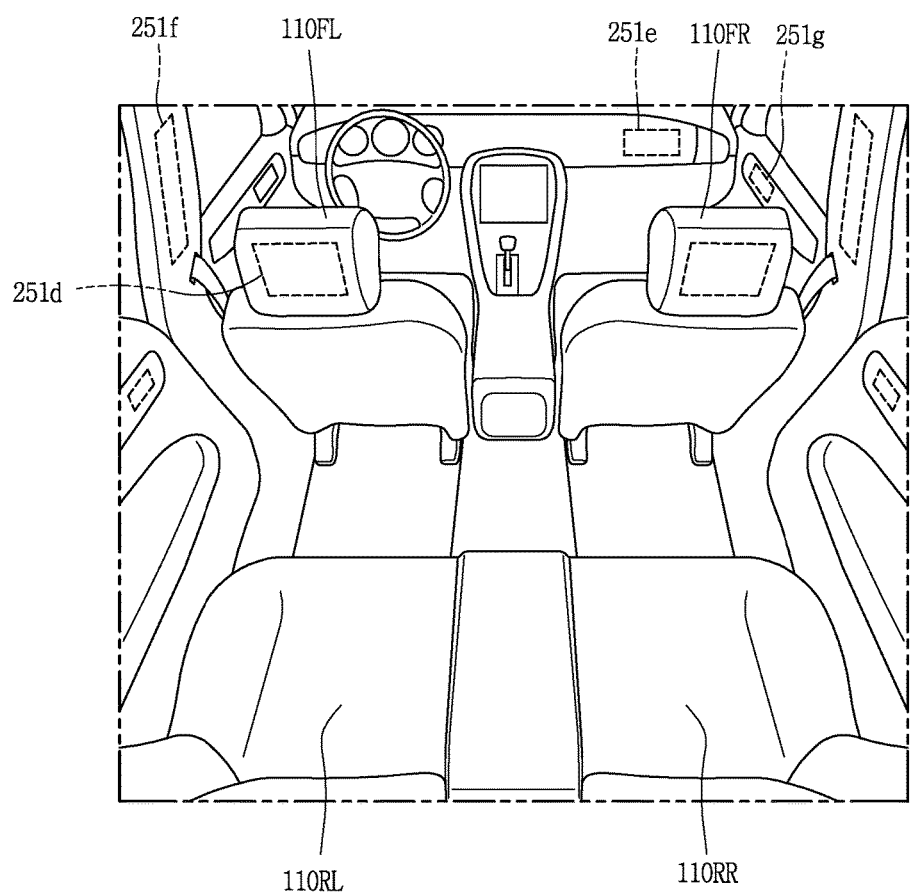

Implementations disclosed herein provide a control device for a vehicle configured to control one or more lamps of the vehicle to effectively acquire surrounding information related to an available parking space in a state of parking the vehicle.

In accordance with some implementations disclosed herein, the control device may turn on at least part of a plurality of lamps provided on a vehicle to facilitate acquisition of surrounding information related to an available parking space upon parking the vehicle. Therefore, in some scenarios, such configurations may improve an acquisition rate or recognition rate of the surrounding information regarding the available parking space.

In addition, according to some implementations, a control unit may facilitate parking by improving a recognition rate of a parking space or objects around the vehicle in a mode of turning on at least part of the plurality of lamps upon parking the vehicle, and notify the ongoing parking of the vehicle to people or other vehicles around the vehicle using the other lamps.

A vehicle disclosed herein may be any suitable motorized vehicle, such as a car, motorcycle, and the like. Hereinafter, description of implementations involving a car will be given as examples.

A vehicle according to the present disclosure may be powered by any suitable power source, and may be, for example, an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

As illustrated in FIGS. 1 to 7, a vehicle 100 may include wheels that are configured to turn by a driving force, and a steering apparatus 510 for adjusting a driving (ongoing, moving) direction of the vehicle 100.

In some implementations, the vehicle 100 may be an autonomous vehicle that autonomously performs one or more driving operations of the vehicle 100.

In some scenarios, the vehicle 100 may be selectively switched into an autonomous mode or a manual mode, for example based on a user input. As a specific example, the vehicle may be converted from the manual mode into the autonomous mode or from the autonomous mode into the manual mode based on a user input received through a user interface apparatus 200.

In some implementations, the vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

Figure 7:
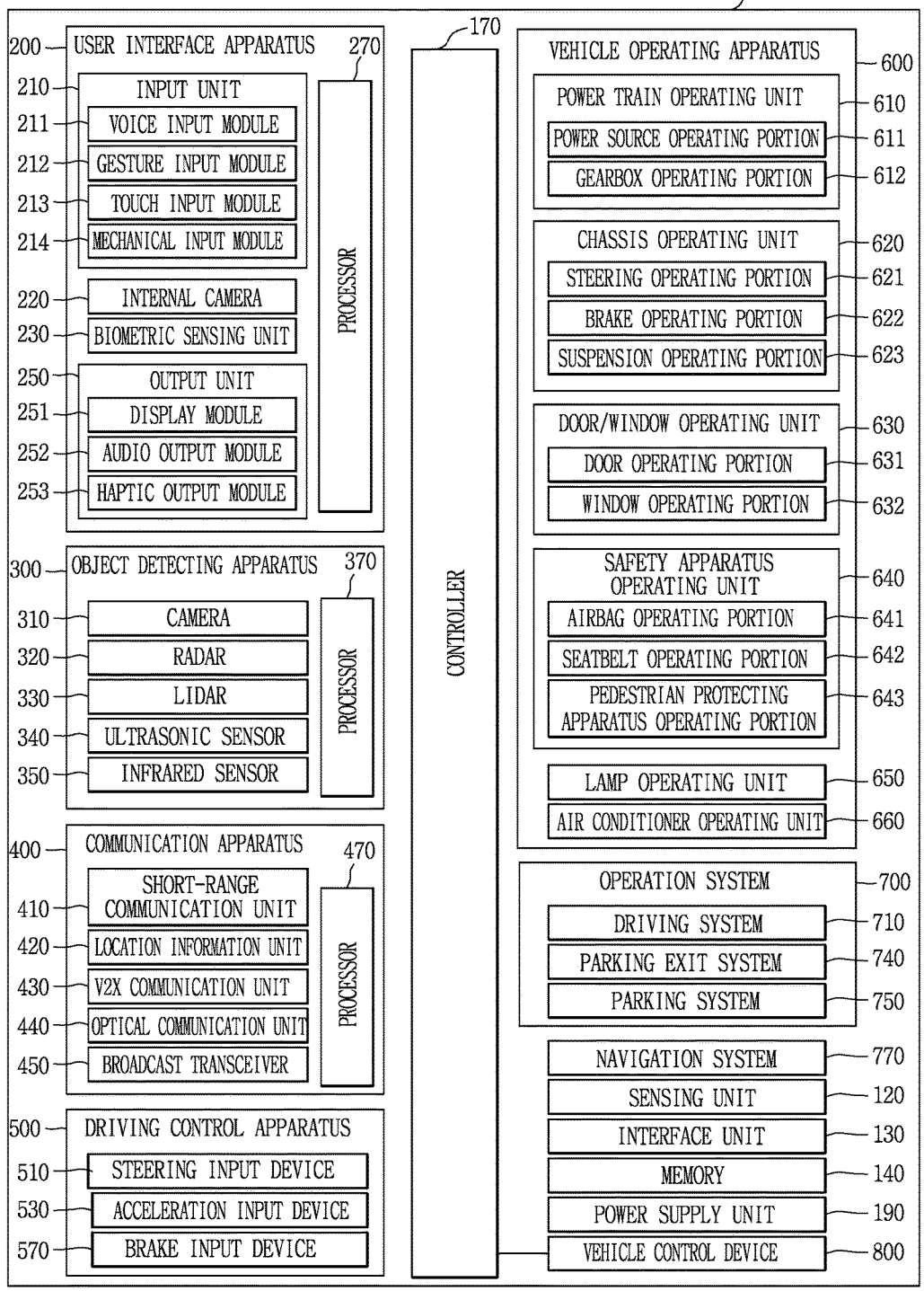
FIG. 7 is a block diagram illustrating an example of a vehicle in accordance with some implementations.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, at least one processor such as controller 170, and a power supply unit 190.

According to implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to implementations, the user interface apparatus 200 may include more components in addition to components to be explained in this specification or may not include some of those components to be explained in this specification.

The input unit 210 may allow the user to input information. Data that is input into the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor or an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an implementation, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel, or a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252, or a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display, or an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, or a transparent LED display. The transparent display may have adjustable transparency.

In some implementations, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an implementation, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Figure 5:
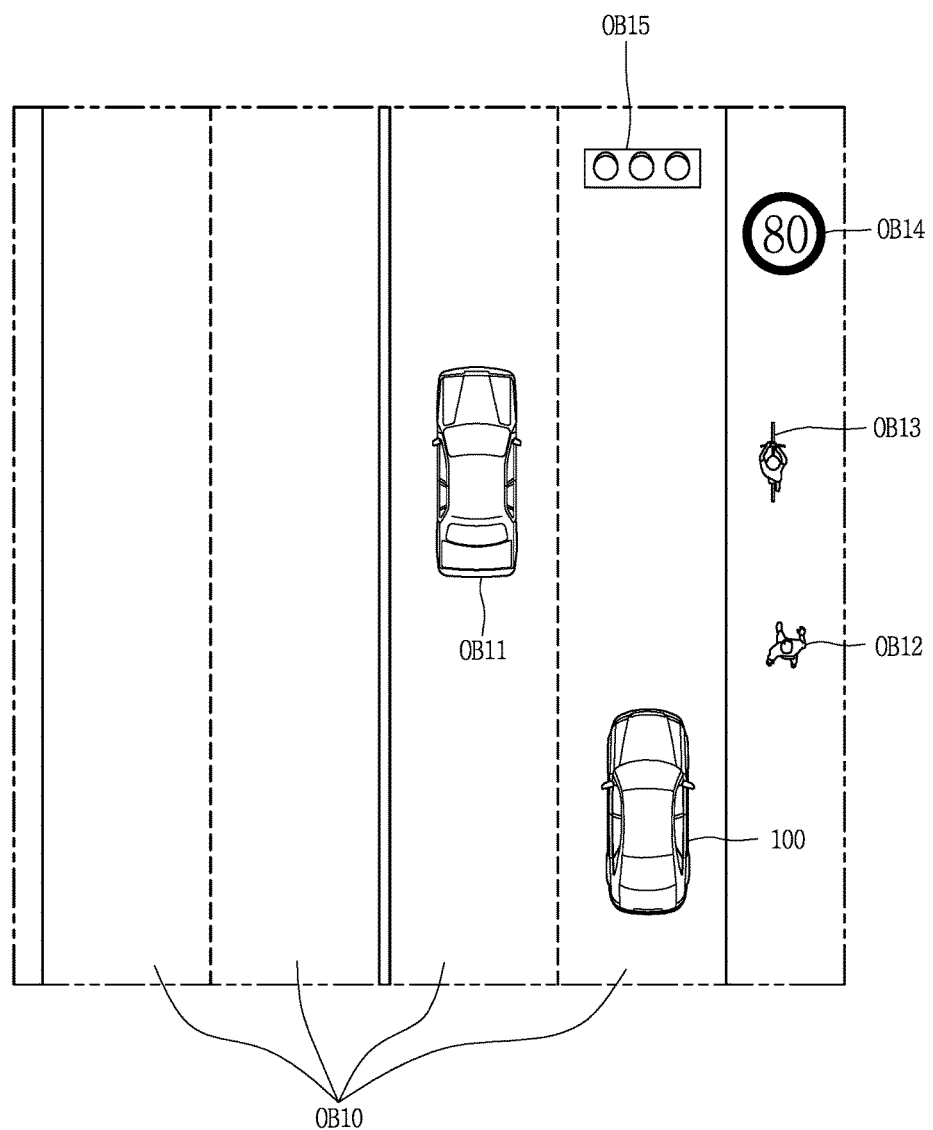
FIGS. 5 and 6 are diagrams illustrating examples of a vehicle detecting objects outside the vehicle in accordance with some implementations.
Figure 6:
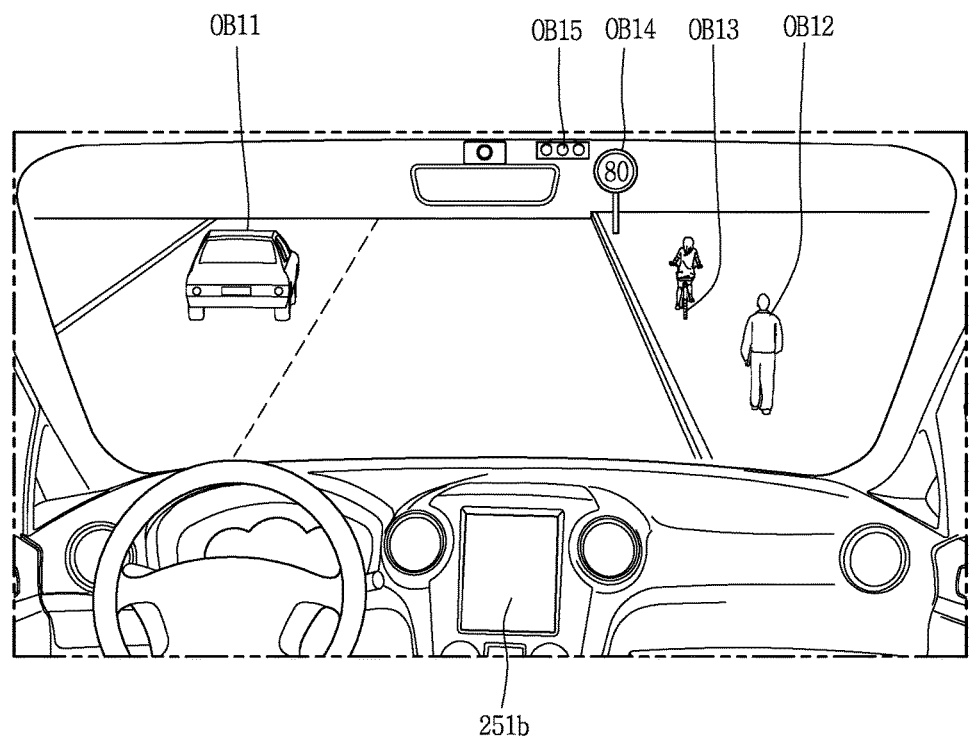

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an implementation, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an implementation, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, or a radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an implementation, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to implementations, the operation system 700 may further include other components in addition to components to be described, or may not include some of the components to be described.

In some implementations, the operation system 700 may include a processor. Each unit of the operation system 700 may individually include a processor.

According to implementations, the operation system may be a sub concept of the controller 170 when it is implemented in a software configuration.

In some implementations, the operation system 700 may be a concept including at least one of the user interface apparatus 200, the object detecting apparatus 300, the communication apparatus 400, the vehicle operating apparatus 600, or the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information, or current location information of the vehicle.

The navigation system 770 may include a memory and a processor. The memory may store the navigation information. The processor may control an operation of the navigation system 770.

According to implementations, the navigation system 770 may update prestored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, or electric units performing other functions.

In some implementations, the vehicle 100 may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for convenience of explanation. In this disclosure, functions (operations) and control methods described in relation to the vehicle control device 800 may be executed by the controller 170 of the vehicle. As such, one or more features described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, description will be given in more detail of components included in the vehicle control device 800 in accordance with one implementation, with reference to the accompanying drawings.

Figure 8:
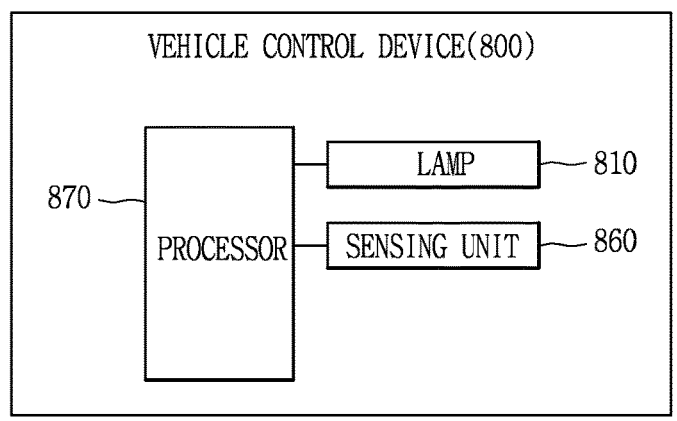
FIG. 8 is a diagram illustrating an example of a vehicle control device in accordance with some implementations.

FIG. 8 is a diagram illustrating an example of a vehicle control device in accordance with some implementations.

The vehicle control device 800 may include a plurality of lamps 810. The plurality of lamps 810 may be provided on the vehicle 100.

The plurality of lamps 810 may be lamps for vehicle provided on the vehicle, and include head lamps 1120a and 1120b (see FIG. 10) provided on the front of the vehicle to emit visible light to the front of the vehicle, rear lamps 1120c and 1120d (see FIG. 10) provided on the rear of the vehicle to emit (output) visible light to the rear of the vehicle, and a turn indicator lamp (not illustrated) provided on at least one of the head lamps, the rear lamps, side surfaces of the vehicle, or side mirrors.

Also, at least one of the front surface of the vehicle and the head lamps may further be provided with a fog lamp, a tail lamp, a cornering lamp configured such that a light emitting (or output) direction thereof is varied in response to a manipulation of a steering apparatus, and the like.

Also, at least one of the rear surface of the vehicle and the rear lamps may further be provided with a reversing light which is lighted on when a reverse gear is set.

The rear lamps may include brake lamps (or braking lamps) that emit light to the rear of the vehicle, in response to the brake apparatus being driven (or a brake pedal being depressed).

The turn indicator lamp may also serve as an emergency lamp.

The plurality of lamps described herein may include any suitable type of lamp. Hereinafter, for convenience of explanation, examples of head lamps and rear lamps will be described.

The head lamps may be turned on when a user request is received through the lamp operating unit 650, the mechanical input module 214 or the driving control apparatus 500. When the head lamps are turned on, the head lamps may output light to the front of the vehicle 100.

As one example, the head lamps may output low beams to the front of the vehicle 100 when a low beam output request is received by a user request. The low beam may form a preset cut-off line, which may have various shapes according to designs.

Also, the head lamps may output high beams to the front of the vehicle 100 when a high beam output request is received by a user request. When the high beam output is requested, in general, low beams and high beams may be output simultaneously. An output area of the high beam and an output area of the low beam may partially overlap each other.

In some implementations, the low beam or high beam may be output to the front of the vehicle according to the control of the vehicle control device 800. For example, when a light output request is received through the lamp operating unit 650, the mechanical input module 214 or the driving control apparatus 500, at least one processor (e.g., processor 870 of the vehicle control device 800) may control the head lamps to output light to the front of the vehicle.

Also, the head lamps may be turned on when it is detected by the sensing unit 120 or 860 that ambient brightness is lower than reference brightness (preset brightness). For example, the processor 870 may control the head lamps to output light to the front of the vehicle when ambient brightness of the vehicle detected by the sensing unit 120 or 860 is lower than the preset brightness.

In some implementations, the head lamp, the rear lamps or both may be configured to vary a light output direction.

For example, the head lamps may vary the light output direction according to the control of the processor 870 of the vehicle control device 800.

For example, the processor 870 may control the head lamps to output light in an upward direction (e.g., a height direction H) based on a preset condition (e.g., a user's manipulation or surrounding environments) while outputting light in an overall-length direction L.

The foregoing example has illustrated that the head lamps can vary the light output direction to the upward direction, but implementations are not limited to this, and the head lamps, the rear lamps, or both may be configured to change the light output direction into any suitable direction.

The light output direction of the head lamps (or rear lamps) may be varied (changed) by at least one of various components (e.g., a light source, a reflector, a shield, a forming body or a lens) constructing each head lamp (or rear lamp), or by a deformation member provided on a housing of the head lamp (or rear lamp) or on an outside of the head lamp (or rear lamp).

In some implementations, the processor 870 controls (changes, varies) the light output direction of the head lamp (or rear lamp) using at least one of the components of the head lamp (or rear lamp), the housing, or the deformation member. However, implementations of the present disclosure are not limited to such control, and may alternatively employ different configurations, functions, or the like, that are configured to vary (change) the light output direction of the head lamp.

In some implementations, at least one of the plurality of lamps disclosed herein may include a plurality of light sources. The at least one of the plurality of lamps may be provided with the plurality of light sources in a matrix configuration or a micro configuration. Also, the plurality of light sources may be provided in a matrix configuration in a size of a micro unit.

Each of the plurality of light sources may be a halogen lamp, a light emitting diode (LED) or a laser diode (LD).

The plurality of light sources may be controlled individually. For example, at least one processor (e.g., processor 870) may control the plurality of light sources individually (or independently).

Here, the individual control of the plurality of light sources may include the meaning that the plurality of light sources can be individually turned on/off, light output brightness (or output intensity) of light of the plurality of light sources can be individually adjusted, and the light output directions of the plurality of light sources can be individually varied.

For example, the processor 870 may control some of the plurality of light sources to output light in a first output direction and the other of the plurality of light sources to output light in a second output direction different from the first output direction.

As another example, the processor 870 may control some of the plurality of light sources, which are provided in at least one of the plurality of lamps 810, to output light toward the front of the vehicle and the other of the plurality of light sources to output light to an object detected by the sensing unit 120 or 860. When the detected object is located before (in front of) a side of the vehicle or before an upper side of the vehicle, at least one of the plurality of lamps may output light into two ways.

In some implementations, the rear lamps may output visible light to the rear of the vehicle when the brake apparatus is driven or operated. The brake apparatus, for example, may be operated when the user depresses the brake pedal.

The rear lamps may emit (output) light to the rear of the vehicle even when the brake apparatus is operated by an Automatic Emergency Braking (AEB) system as well as when the brake apparatus is driven in response to the brake pedal provided in the vehicle being depressed.

A function (or system) of operating (working) the brake apparatus 153 when a potential collision of the vehicle is more than a reference value even though the brake pedal is not depressed may be referred to as an AEB system.

The AEB system may be one of main functions of an Adaptive Driving Assistance System (ADAS), which may remarkably enhance safety of the vehicle.

Also, the brake apparatus may include at least one of a hydraulic brake that is operated by a brake paddle, an engine brake that decelerates a vehicle by increasing an engine speed (engine RPM) using friction between the engine and a gearbox, a parking brake, or other type of braking apparatus.

The operation in which the rear lamps 154 emit light in response to the operation of the brake apparatus may be performed under the control of at least one processor (e.g., processor 870 or controller 170).

Also, in hardware (or electric) configurations, the vehicle 100 disclosed herein may be pre-designed in a manner that the rear lamps emit visible light to the rear of the vehicle, without the control of a separate component (e.g., processor such as controller 170 or processor 870), when the brake apparatus is operated.

In some implementations, the vehicle control device 800 include a sensing unit 860.

The sensing unit 860 may be the object detecting apparatus 300 illustrated in FIG. 7, or the sensing unit 120 provided in the vehicle 100.

The sensing unit 860 may be implemented by combining at least two of the camera 310, the radar 320, the LiDAR 330, the ultrasonic sensor 340, the infrared sensor 350 and the sensing unit 120 provided in the object detecting apparatus 300.

The sensing unit 860 may sense information related to the vehicle 100.

The vehicle-related information may be at least one of vehicle information (or a driving state of the vehicle) or surrounding information of the vehicle.

For example, the vehicle information may include a driving speed of the vehicle, a weight of the vehicle, a number of persons in the vehicle, a braking force of the vehicle, a maximum braking force of the vehicle, a driving mode of the vehicle (e.g., autonomous or manual driving mode), a parking mode of the vehicle (e.g., autonomous parking mode, automatic parking mode, or manual parking mode), and the like.

The surrounding information of the vehicle, for example, may include a state (frictional force) of a road surface on which the vehicle is currently moving, the weather, a distance from a front (or rear) vehicle, a relative speed of a front (or rear) vehicle, a curvature of a curve when a currently-driving lane is curved, and the like.

Also, the surrounding information of the vehicle (or surrounding environment information) may include external information regarding the vehicle (e.g., ambient brightness, temperature, a position of the sun, information regarding subjects around the vehicle (e.g., persons, other vehicles, traffic signs, etc.), a type of a currently-driving road surface, a feature (landmark), line information, driving lane information, and information required for an autonomous driving/autonomous parking/automatic parking/manual parking mode.

The surrounding information of the vehicle may further include a distance between the vehicle 100 and an object present near the vehicle, a type of the object, an available parking space for the vehicle, an object (e.g., a parking line, a string, another vehicle, a wall, etc.) for identifying a parking space, and the like.

Hereinafter, description will be given for the scenario in which the sensing unit 860 is separately provided in the vehicle control device 800. Obtaining information by the processor 870 through the sensing unit 860 may include the processor 870 acquiring information using at least one of the object detecting apparatus 300 or the sensing unit 120 provided in the vehicle 100.

The vehicle control device 800 may include at least one processor, such as the processor 870, configured to control the plurality of lamps 810 and the sensing unit 860. In some implementations, the processor 870 may be the controller 170 illustrated in FIG. 7. However, in some implementations, the processor 870 may be different from the controller 170 or may share one or more components in common with controller 170. As such, in some implementations, the processor 870 of FIG. 8 may control the components illustrated in FIG. 7.

The processor 870 included in the vehicle control device 800 may turn on a lamp, among the plurality of lamps, that enters an area adjacent to an available parking space, in a preset manner (also referred to herein as an illumination mode), based on the sensing unit 860 sensing that the vehicle 100 enters the area. The area that is adjacent to a parking space may be an area that is adjacent to one or more sides of the parking space, or may be an area that surrounds the parking space.

Here, the preset manner in which the lamp is turned on may be any suitable manner in which a lamp is illuminated. For example, the preset manner may correspond to turning on the lamp continuously, or may correspond to turning on the lamp with a specific on/off pattern. In some implementations, the particular preset manner may depend on conditions in or around the vehicle, and may not always be a single fixed manner of illumination. The preset manner may, in some implementations, be implemented irrespective of a specific type of the lamp. For convenience of explanation, the description herein will focus on the scenario in which the preset manner of illuminating the lamp(s) is by continuously illuminating the lamp(s).

With this configuration, implementations disclosed herein may output more light to a parking space and surroundings of the parking space by turning on at least one of the plurality of lamps while parking the vehicle, thereby increasing ambient brightness of the parking space. In some scenarios, this may improve a recognition rate of recognizing the parking space and an object existing near the parking space. By improving such recognition rates, an autonomous/automatic parking success rate may be improved. As such, warning signals that indicate objects near the vehicle may be more accurately notified to the user in the manual parking mode, thereby reducing an accident rate.

Hereinafter, description will be given in more detail of a vehicle control device configured to control one or more lamps in an improved manner upon parking a vehicle, and a method for controlling the vehicle, with reference to the accompanying drawings.

Figure 9:
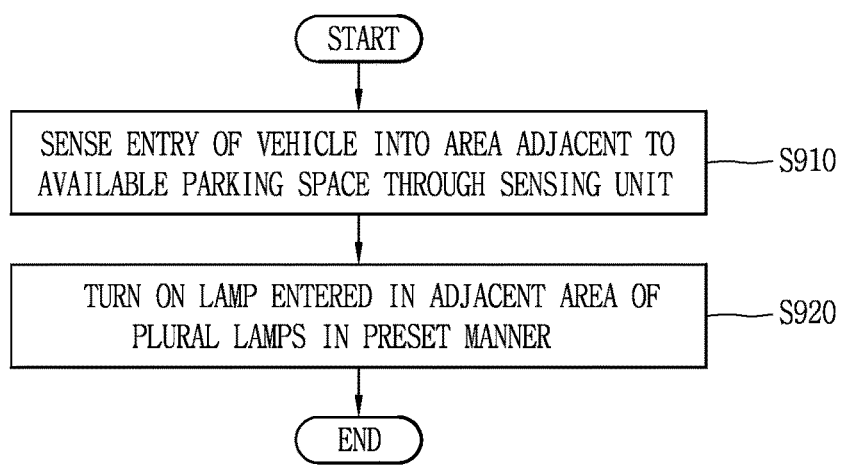
FIG. 9 is a flowchart illustrating an example of controlling a vehicle according to some implementations.

FIG. 9 is a flowchart illustrating an example of control technique according to some implementations, and FIGS. 10, 11A, 11B and 11C are diagrams illustrating examples of the control technique illustrated in FIG. 9.

The control technique illustrated in FIG. 9 may be executed by the control of at least one processor, such as the vehicle control device 800, and/or the processor 870, and/or the controller 170. For convenience of description, examples herein will describe scenarios in which processor 870, which may be implemented by one or more processors, controls vehicle lamps according to implementations described herein.

Also, details to be described hereinafter may be equally/selectively applied to a manual parking mode, an automatic parking mode, and an autonomous parking mode.

The manual parking mode may refer to a mode of executing parking by a driver's manipulation.

The automatic parking mode may refer to a mode in which a vehicle is automatically parked into a corresponding available parking space based on a user setting according to a preset algorithm, near the available parking space.

The autonomous parking mode may refer to a mode in which the vehicle 100 detects or searches for an available parking space by itself at an arbitrary place, moves to the corresponding parking space in an autonomous driving manner, and then executes automatic parking.

Figure 10:
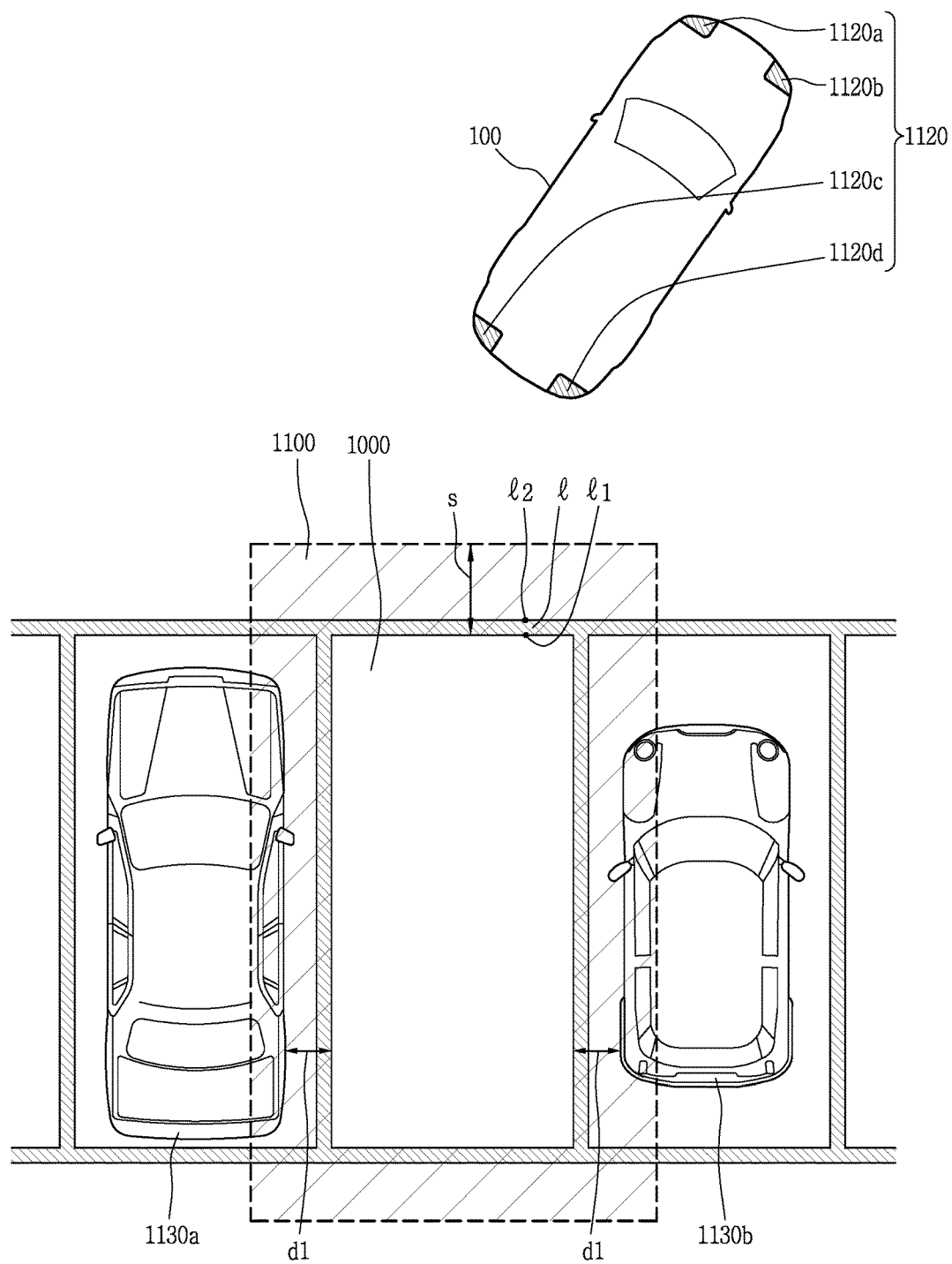
FIGS. 10 and 11A to 11E are diagrams illustrating examples of scenarios of controlling of a vehicle illustrated in FIG. 9.

Referring to FIGS. 9 and 10, it is sensed through the sensing unit 860 that the vehicle 100 enters an area 1100 adjacent to an available parking space 1000 (S910). In these examples, the area 1100 adjacent to a parking space is an area that surrounds the parking space, but implementations are not limited thereto, and the area 1100 may be any suitable area that is adjacent to one or more sides of a parking space.

The processor 870 may sense information related to the vehicle through the sensing unit 860. Here, one of the vehicle-related information may be the available parking space and/or an area adjacent to the parking space.

The processor 870 may detect the available parking space when a preset condition is met.

The preset condition may refer to a condition that it is determined that the vehicle is to execute parking, and may be associated with at least one of a speed of the vehicle, a position of the vehicle, an entry into a parking mode in response to a user request, a gear state, or a surrounding environment.

For example, the processor 870 may detect the parking space when the speed of the vehicle 100 is less than a predetermined speed, or the position of the vehicle is within a parking-available area (e.g., parking lot, etc.).

As another example, the processor 870 may detect the parking space when the vehicle is switched into the autonomous parking mode or the automatic parking mode by the user or the gear of the vehicle is changed from a forward gear into a reverse gear.

As another example, the processor 870 may detect the parking space when the surrounding environment detected through the sensing unit 860 (e.g., camera) is determined as a parking-available area.

The processor 870 may determine (sense, detect, extract) the available parking space in various manners. For example, referring to FIG. 10, a parking line l may be sensed, and it may be determined that parking is available at an inner space within the parking line l. As such, the processor 870 may sense the inner space as the parking space 1000. As another example, at least one another vehicle 1130*a* and/or 1130*b* may be sensed through the sensing unit 860, and it may be determined that parking is available at a space that is spaced from the sensed vehicle 1130*a*, 1130*b* by a predetermined distance d1. As such, the processor 870 may sense this space as the parking space 1000. In some implementations, the processor 870 may determine whether a sensed space is an available parking space based on a size (e.g., width, length) of the vehicle relative to a size of the sensed space.

In the example of FIG. 10, based on detecting a parking space 1000, the processor 870 may then determine an area 1100 that is adjacent to the parking space 1000. The adjacent area 1100 may be adjacent to one or more sides of the detected parking space 1000. In some implementations, the adjacent area 1100 may be an area within a predetermined distance from a boundary of the parking space 1000. For example, as illustrated in FIG. 10, the adjacent area 1100 may be an area within a predetermined distance s from a first line (inner line) l1 of a parking line delineating the parking space 1000. As another example, the adjacent area 1100 may be an area within the predetermined distance s from a second line (outer line) l2 of the parking line delineating the parking space 1000.

The adjacent area 1100 may be formed adjacent to an outer side of the parking space 1000. The adjacent area 1100 may be adjacent to one or more sides of the parking space 1000.

The predetermined distance s over which the adjacent area 1100 extends may be determined by the processor 870 according to a preset algorithm or set/changed according to a user manipulation. In addition, the predetermined distance d1 may also be decided by the processor 870 according to a preset algorithm or set/changed according to a user manipulation.

The processor 870 may detect whether a portion of the vehicle 100 has entered into the adjacent area 1100 that is adjacent to the parking space 1000.

Referring back to FIG. 9, the processor 870 may detect that a lamp, among the plurality of lamps, has entered a particular area (e.g., the area adjacent to a parking space). In such scenarios, the processor 870 may turn on that lamp in a preset manner, also referred to herein as an illumination mode (S920).

The vehicle 100 may be provided with a plurality of lamps 1120. For example, as illustrated in FIG. 10, the plurality of lamps 1120 may include head lamps 1120*a* and 1120*b*, rear lamps 1120*c* and 1120*d*, or other lamps such as those provided on side surfaces of the vehicle. The plurality of lamps 1120*a*, 1120*b*, 1120*c* and 1120*d*, as illustrated in FIG. 10, may be provided on different positions of the vehicle.

The processor 870 may determine (identify, detect, sense, extract), through the sensing unit 860, a lamp that enters the area 1100 adjacent to the parking space 1000, among the plurality of lamps. Based on detecting that a lamp enters the area 1100, the processor 870 may turn on the lamp that enters the area 1100, in a preset manner (also referred to herein as an illumination mode). For example, the preset manner by which the lamp is illuminated may be a manner of continuously turning on the lamp, or may be a manner of illuminating the lamp with an on/off pattern. The preset manner may be irrespective of a type of each of the plurality of lamps and irrespective of a specific lighting method of each lamp.

For example, as shown in FIG. 10, if a rear lamp 1120*d* among the plurality of lamps 1120 enters the area 1100, then the processor 870 may turn on the rear lamp 1120*d* in a preset manner (e.g., continuously), irrespective of the particular types of lamps that may be included in the rear lamp or the specific lighting methods by which each lamp in the rear lamp are normally illuminated. For example, if the rear lamp 1120*d* enters the area 1100, then the processor 870 may illuminate the rear lamp 1120*d* in a preset manner (e.g., continuously), even though a brake apparatus is not operated, and even though the vehicle's gear is not changed into a reverse gear.

Also, if a turn indicator lamp is included in the rear lamp 1120*d*, then the processor 870 may control the turn indicator lamp included in the rear lamp 1120*d* to be turned on in a preset manner (e.g., continuously) as well, irrespective of how the turn indicator lamp normally operates, e.g., irrespective of the turn indicator normally turning on/off at a predetermined period.

As another example, when a head lamp of the plurality of lamps 1120 enters the area 1100, the head lamp that enters the area 1100 may be illuminated in the preset manner (e.g., continuously), even without a separate user manipulation of mechanical input module 214 or lamp operating unit 650. In this instance, the head lamp that enters area 1100 may output a low beam or high beam in the preset manner (e.g., continuously), or output both of the low beam and the high beam in the preset manner.

Also, if a turn indicator lamp is included in the head lamp, then the processor 870 may control the turn indicator light included in the head lamp to be turned on in the preset manner (e.g., continuously), irrespective of a specific lighting method by which the turn indicator light normally operated (e.g., irrespective of the turn indicator light normally turning on/off with a predetermined period).

As such, implementations disclosed herein may adaptively turn on a lamp in a preset manner (e.g., continuously turn on the lamp) that enters the area 1100 adjacent to the parking space 1000, among the plurality of lamps 1120 provided on the vehicle. As such, this may improve light intensity and brightness around the parking space, thereby increasing a recognition rate that a camera and various sensors included in the sensing unit 860 sense information to facilitate parking.

In some implementations, the processor 870 may activate multiple lamps among the plurality of lamps 1120 provided on the vehicle in the preset manner. For example, the processor 870 may activate a plurality of lamps in an order in which the lamps enter the area 1100 adjacent to the parking space 1000.

Figure 11B:
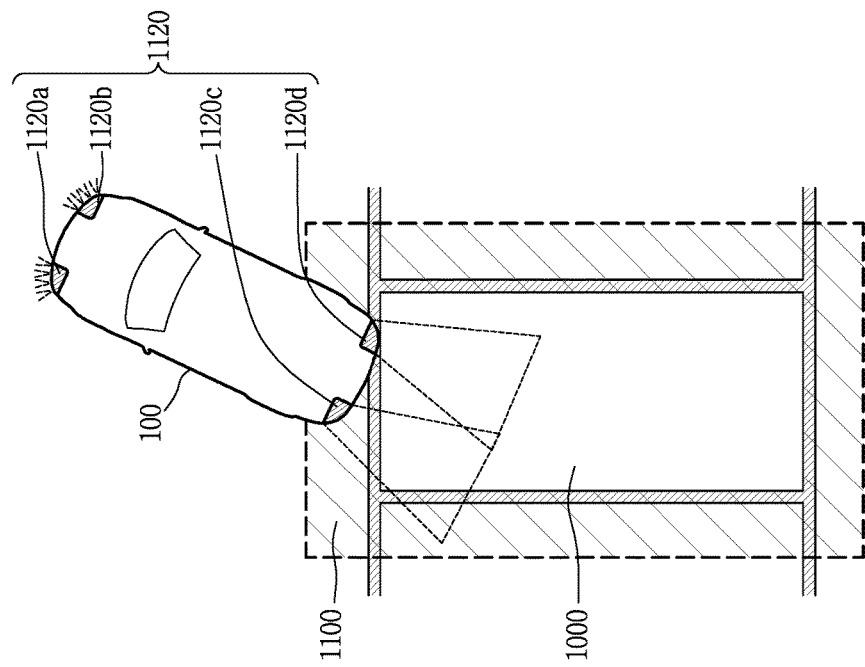
Figure 11A:
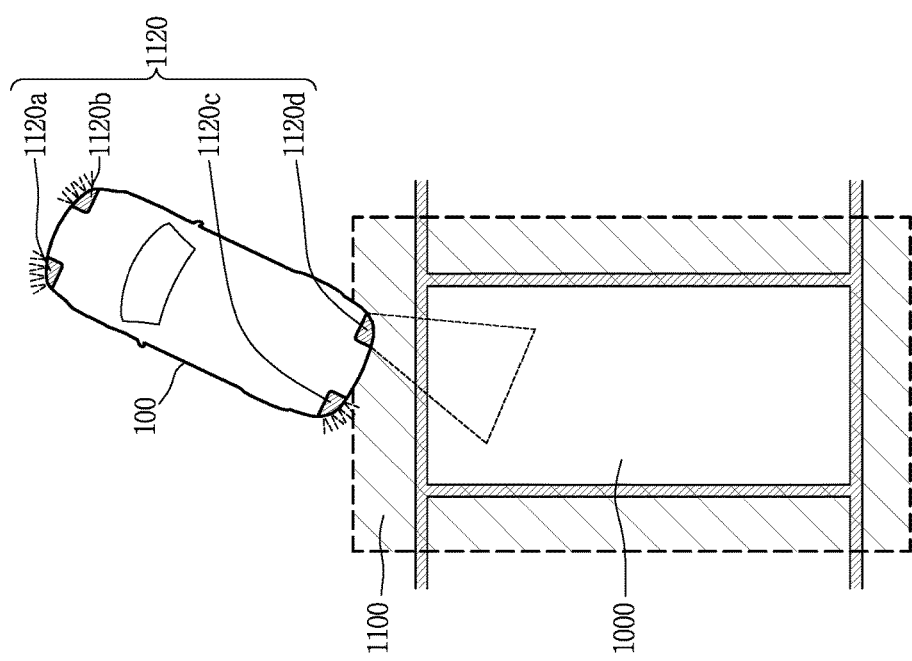

As illustrated in FIG. 11A, the processor 870 may turn on, in a preset manner (e.g., continuously), the fourth lamp 1120*d* when the fourth lamp 1120*d* of the plurality of lamps 1120 provided on the vehicle enters the area 1100 adjacent to the parking space 1000.

Afterwards, as a parking operation of the vehicle is performed, as illustrated in FIG. 11B, if the third lamp 1120*c* of the plurality of lamps 1120 enters the adjacent area 1100 after the entry of the fourth lamp 1120*d* into the area 1100, then the processor 870 may also turn on the third lamp 1120*c* in the preset manner (e.g., continuously).

As such, the processor 870 may turn on multiple lamps among the plurality of lamps 1120 in the preset manner (e.g., continuously) in an order in which the lamps enter the area 1100 adjacent to the parking space 1000. In some implementations, the processor 870 may turn on the multiple lamps in different preset manners (e.g., with different intensities or patterns), or may turn on the lamps in the same preset manner.

In some implementations, the processor 870 may continue turning on the plurality of lamps 1120 in the preset manner even after the plurality of lamps 1120 have passed through the adjacent area 1100 and entered the parking space 1000.

Figure 11C:
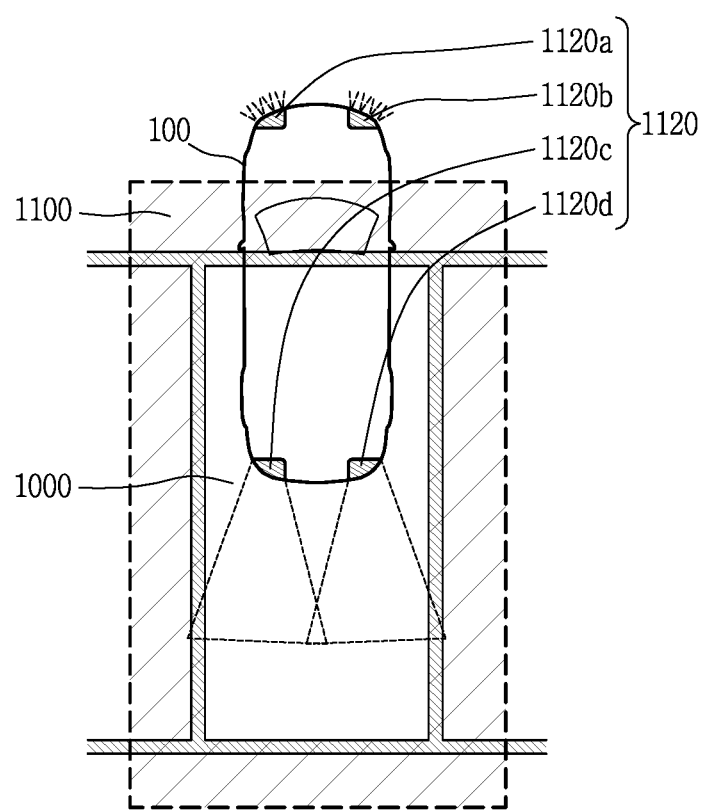

As illustrated in the example of FIG. 11C, at least one lamp 1120*c* and 1120*d* among the plurality of lamps 1120 may have been activated in the preset manner based on entering the area 1100 adjacent to the parking space 1000. Subsequently, when the at least one lamp 1120*c* and 1120*d* enters the parking space 1000 after passing through the adjacent area 1100, then the processor 870 may continue turning on the at least one lamp 1120*c* and 1120*d* in the preset manner.

With this configuration, implementations disclosed herein may maintain an increased state of intensity and brightness of light emitted to a parking space and adjacent areas even after the vehicle enters the parking space, thereby maintaining an increased recognition rate of the sensor detecting the surrounding environment (surrounding information) until completely parking the vehicle.

In some implementations, the processor 870 may continue turning on one or more lamps in the preset manner until parking is completed (e.g., until a time point that the gear is changed to a parking gear), or may turn off one or more lamps that were turned on based on the vehicle 100 entering the parking space 1000 or based on a movement of the vehicle 100 by a predetermined distance after entering the parking space 1000.

Furthermore, in some implementations, one or more lamps that have not yet entered the adjacent area 1100 may nonetheless be activated. In some scenarios, such lamps may only be activated for a limited duration of time.

For example, the scenario illustrated in FIG. 11A shows that lamps 1120*a*, 1120*b*, and 1120*c* have not yet entered adjacent area 1100. Nonetheless, in some implementations, the processor 870 may activate the lamps 1120*a*, 1120*b*, and 1120*c* with a predetermined period. Here, turning on the lamps for the predetermined period may correspond to controlling the lamps to be turn on/off with the predetermined period. For example, the predetermined period may be implemented by a specific lighting method of an emergency lamp (e.g., a method of flicking the emergency lamp), or other suitable lighting pattern.

In some implementations, the processor 870 may turn on one or more lamps that have not yet entered the adjacent area 1100 a predetermined period, based on an entry of another lamp in the adjacent area 1100. For example, as shown in FIG. 11A, lamps 1120*a*, 1120*b*, and 1120*c* may be activated with the predetermined period based on lamp 1120*d* having entered area 1100. Also, in some implementations, the processor 870 may turn on one or more lamps with a predetermined period when the vehicle is switched into an autonomous parking mode or an automatic parking mode, e.g., by a user manipulation, even if the lamps have not yet entered the adjacent area 1100.

In such scenarios, in a state in which a lamp has not yet entered area 1100 and is therefore turned on with the predetermined period (e.g., as shown in FIG. 11A, lamp 1120*c*), when that lamp finally enters the adjacent area 1100, then the processor 870 may switch the lamp from illuminating with the predetermined period to illuminating in the preset manner (e.g., as shown in FIG. 11B, switching lamp 1120*c* from illuminating with the predetermined period to instead illuminate in the preset manner, e.g., continuously).

The foregoing description has been given of implementations in which a lamp is turned on in the preset manner, in response to the lamp entering the adjacent area 1100. However, implementations are not limited to this. In some implementations, the processor 870 may also turn on a lamp in the preset manner, in response to the lamp entering the parking space 1000 itself, rather than the adjacent area 1100.

Here, the preset manner, as aforementioned, may be a manner of continuously turning the lamp on, irrespective of a type of each lamp and irrespective of a specific lighting method of each lamp. In general, the present manner may be any suitable illumination manner that facilitates illumination of an area. For example, the preset manner of illumination may be continuous illumination or illumination with a particular on/off pattern.

Figure 11D:
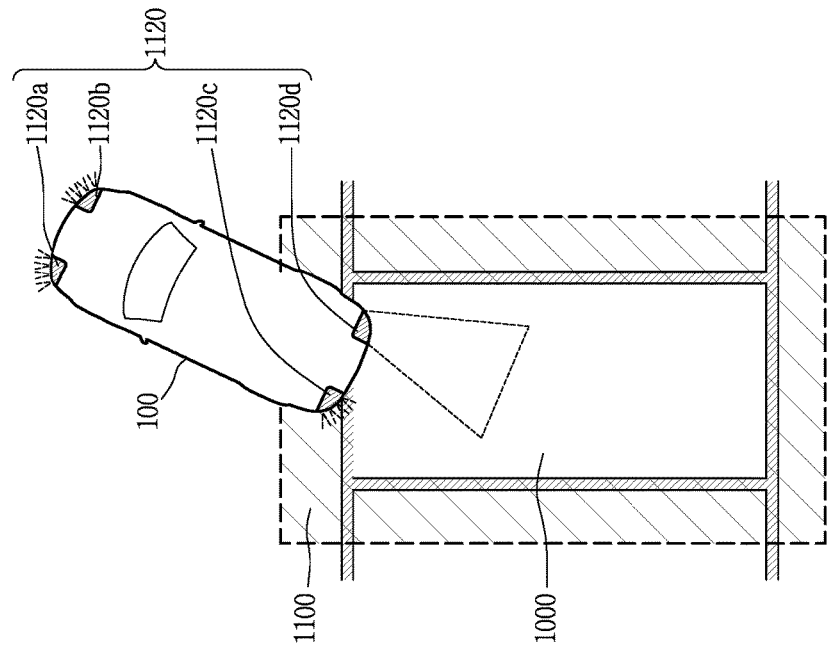
Figure 11E:
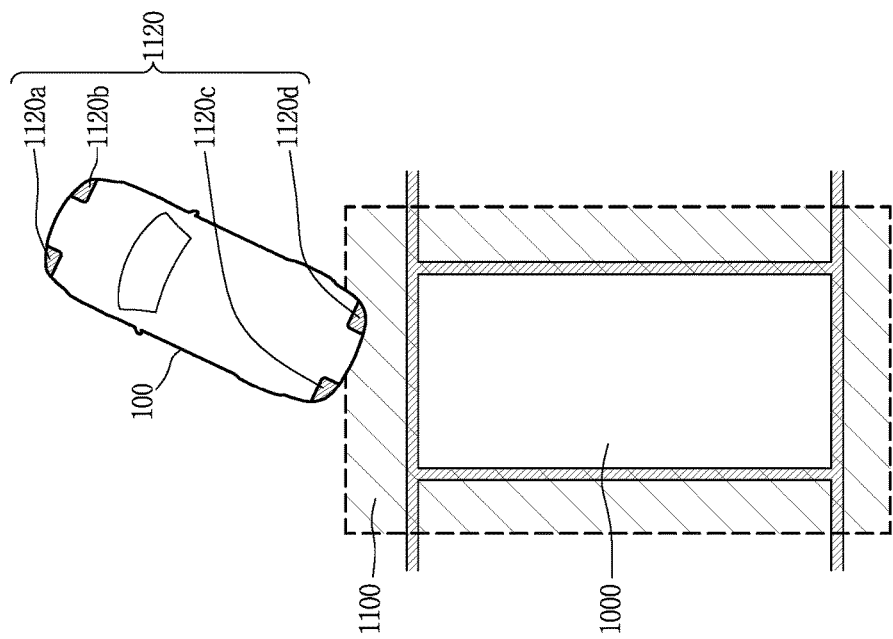

For example, as illustrated in FIG. 11D, even though lamp 1120d enters the adjacent area 1100, the lamp 1120d may not be turned on in the preset manner. Instead, as illustrated in FIG. 11E, the lamp 1120d may be turned on in the preset manner based on entering the parking space 1000 itself, rather than the adjacent area 1100.

Also, in some implementations, when the at least one of the plurality of lamps 1120 enters the parking space 1000, the processor 870 may turn on the other lamps with a predetermined period, even if the other lamps have not yet entered the parking space 1000.

In this manner, implementations disclosed herein may turn on the plurality of lamps in the preset manner (e.g., continuously) based on entry into the adjacent area 1100, or based on entry into the parking space 1000.

The specific operating mode or technique that is utilized may be determined, for example, by a user manipulation or may be predetermined, for example when manufacturing the vehicle at a factory. Also, in some implementations, the particular mode or technique may be changed by a user manipulation.

For convenience of explanation, examples will be described in which one of the plurality of lamps is turned on in a preset manner when the one lamp enters the adjacent area 1100. However, details described in relation to this may equally/similarly be applied even when one of the plurality of lamps enters the parking space 1000 itself, rather than an adjacent area 1100. In addition, for convenience of explanation, examples will be described in which the preset manner is a continuous illumination, although any suitable illumination technique may be applied as the present manner of illumination.

Hereinafter, various examples will be described with reference to the accompanying drawings.

FIGS. 12A to 12D, 13, 14A, 14B, 15A, and 15B are diagrams illustrating examples of controlling lamps provided on a vehicle.

The processor 870 of the vehicle control device 800 may turn on different lamps in the preset manner (e.g., continuously) according to a direction of the vehicle 100 that enters the parking space 1000.

Figure 12A:
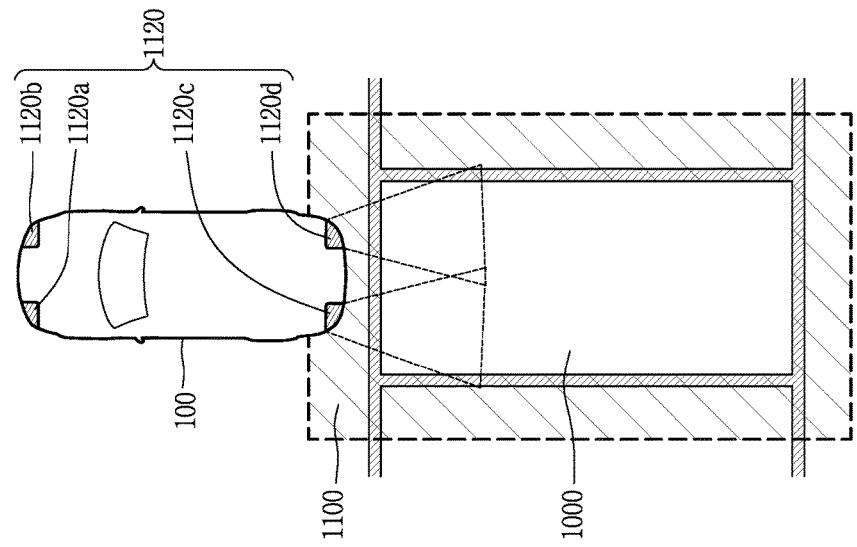
FIGS. 12A to 12D, 13, 14A, 14B, 15A, and 15B are diagrams illustrating examples of controlling lamps provided on a vehicle in accordance with various implementations.

As illustrated in FIG. 12A, when the vehicle 100 enters the area 1100 adjacent to the parking space 1000, starting from a front surface of the vehicle 100, the processor 870 may continuously turn on the lamps 1120a and 1120b provided on the front surface of the vehicle 100 of the plurality of lamps 1120.

Figure 12B:
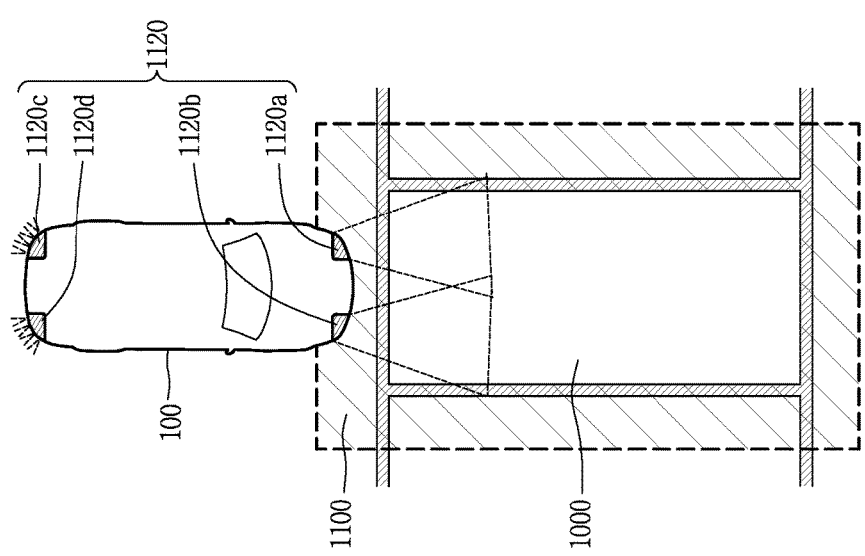

As illustrated in FIG. 12B, when the vehicle 100 enters the area 1100 adjacent to the parking space 1000, starting from a rear surface of the vehicle 100, the processor 870 may continuously turn on the lamps 1120c and 1120d provided on the rear surface of the vehicle 100 of the plurality of lamps 1120.

Here, the lamps 1120a and 1120b provided on the front surface or the lamps 1120c and 1120d provided on the rear surface may continuously be turned on, in response to entering the area 1100 adjacent to the parking space 1000.

In general, the lamps 1120a and 1120b provided on the front surface or the lamps 1120c and 1120d provided on the rear surface may be implemented (e.g., set) to be continuously turned on, in response to entering the parking space 1000.

Also, when the vehicle 100 executes parallel parking, a lamp provided on one side surface which is closer to the parking space of a plurality of side surfaces of the vehicle 100 may continuously be turned on.

Figure 12C:
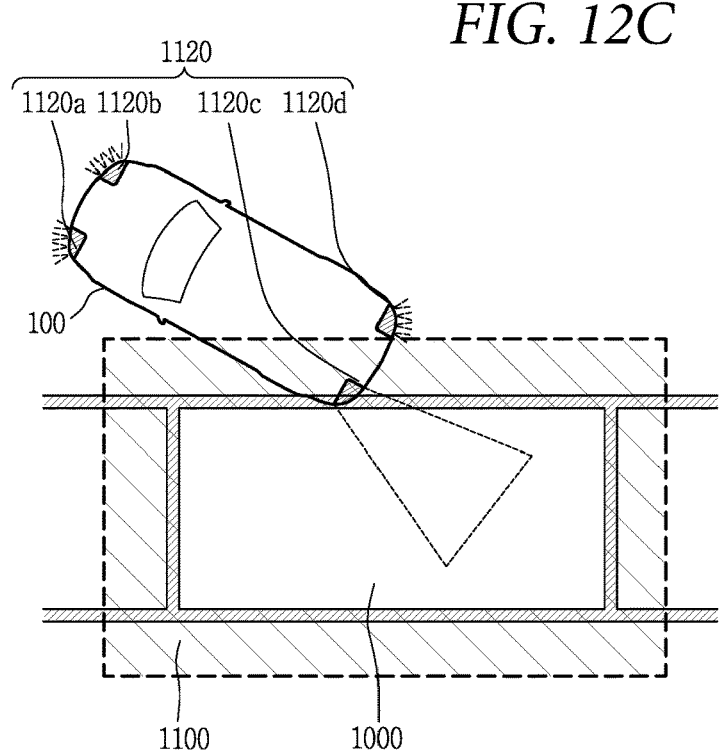

For example, as illustrated in FIG. 12C, when the vehicle 100 executes parallel parking, the processor 870 may continuously turn on the lamp 1120c provided on the one side surface which is closer to the parking space 1000 of the plurality of lamps 1120.

Figure 12D:
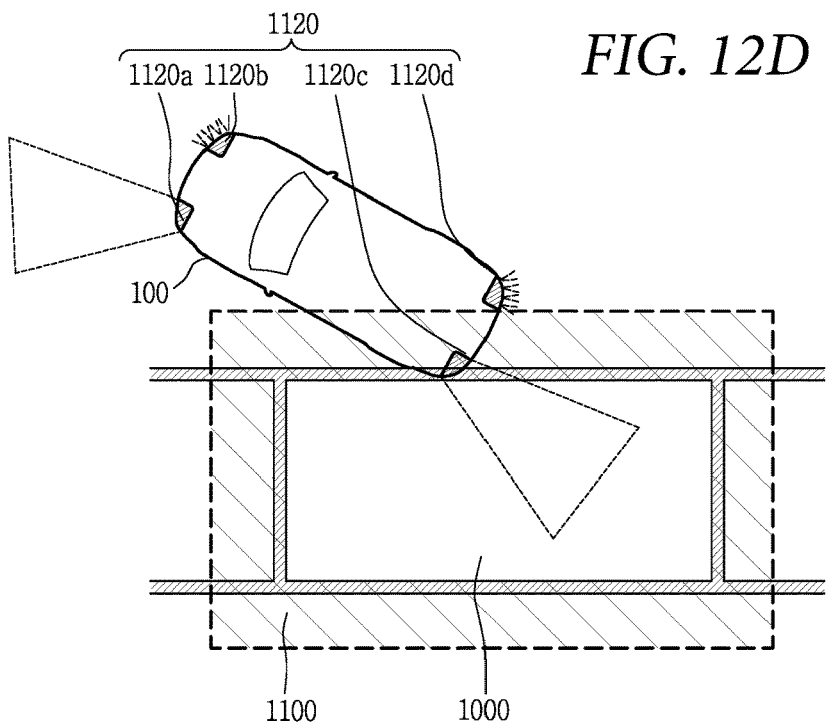

Here, the one side surface is a side surface closer to the parking space of left side surface and right side surface of the vehicle, namely, corresponds to the left side surface based on FIGS. 12C and 12D.

In this instance, the processor 870 may continuously turn on the lamp 1120c entering the area 1100 adjacent to the parking space 1000, of the left lamp 1120a of the head lamps 1120a and 1120b and the left lamp 1120c of the rear lamps 1120c and 1120d.

In some implementations, the processor 870 may also continuously turn on a lamp, which has not entered the adjacent area, of the plurality of lamps provided on the one side surface, when the vehicle executes the parallel parking.

As illustrated in FIG. 12D, when the vehicle executes the parallel parking and the one side surface adjacent to the parking space 1000 is a left side surface, the processor 870 may continuously turn on the lamp 1120a without entering the adjacent area 1100 of the plurality of lamps 1120a and 1120c provided on the left side surface.

During parallel parking operations, implementations described herein may improve sensing of a surrounding environment of the front of the vehicle. Therefore, in some scenarios, implementations described herein may provide an effect of reducing a traffic accident rate occurred during parallel parking operations, by virtue of the configuration illustrated in FIG. 12D.

In some implementations, as aforementioned, at least one of the plurality of lamps 1120 provided on the vehicle 100 may vary a direction of outputting light, namely, a light output direction.

Figure 13:
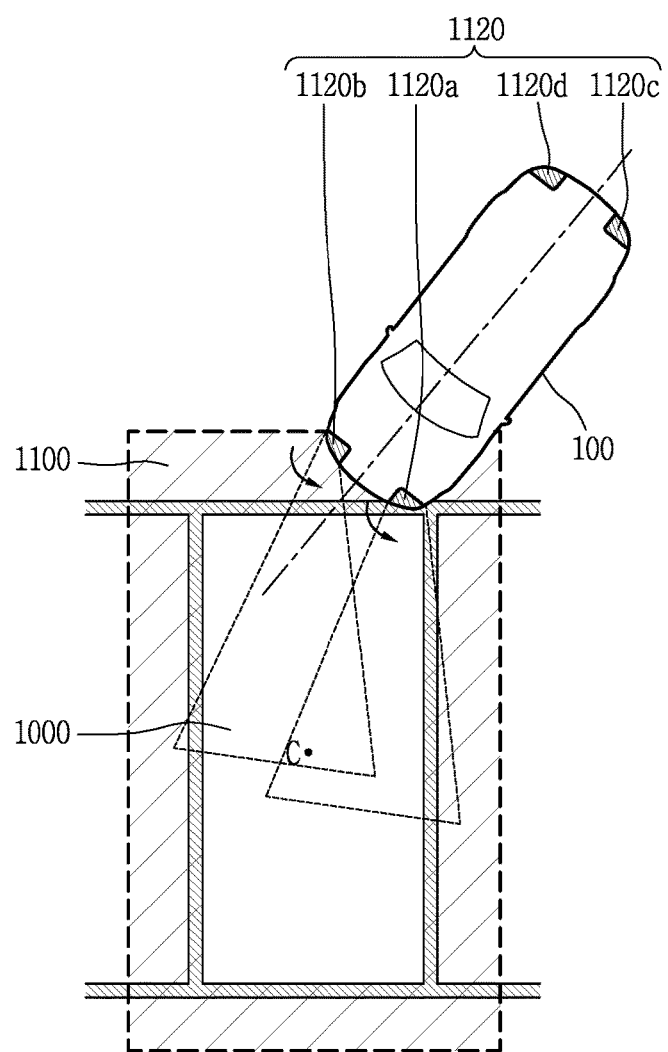

Referring to FIG. 13, the processor 870 may turn on the lamps 1120a and 1120b entering the area 1100 adjacent to the parking space 1000 in the preset manner (e.g., continuous manner).

In this instance, the processor 870 may control a light output direction of the lamps 1120a and 1120b turned on in the preset manner (e.g., continuous manner) such that light can be output toward a center C of the parking space 1000.

When an available parking space for the vehicle is decided, the processor 870 may extract the center of the parking space. The processor 870 may decide whether the light output direction of a lamp provided in a moving direction of the vehicle (e.g., a reference line in parallel to the overall-length direction of the vehicle) faces the center C of the parking space.

When the light output direction of the lamp does not face the center C of the parking space, the processor 870 may change (control) the light output direction to face the center C of the parking space.

For example, when a head lamp enters the adjacent area, the processor 870 may control a cornering lamp (configured to vary the light output direction) provided on the head lamp in a manner that the light output direction of the cornering lamp, which is currently turned on in the preset manner, can be changed to a direction facing the center C of the parking space.

In some implementations, the processor 870 may sense through the sensing unit 860 whether a specific object is present within a predetermined distance from the vehicle 100.

The processor 870 may control the plurality of lamp 1120 provided on the vehicle in different manners according to the sensing result.

Here, the specific object may refer to a preset type of object for deciding whether or not to control the plurality of lamps 1120 in different manners. For example, the specific object may be a person 1400a, another vehicle 1400b and the like.

Figure 14B:
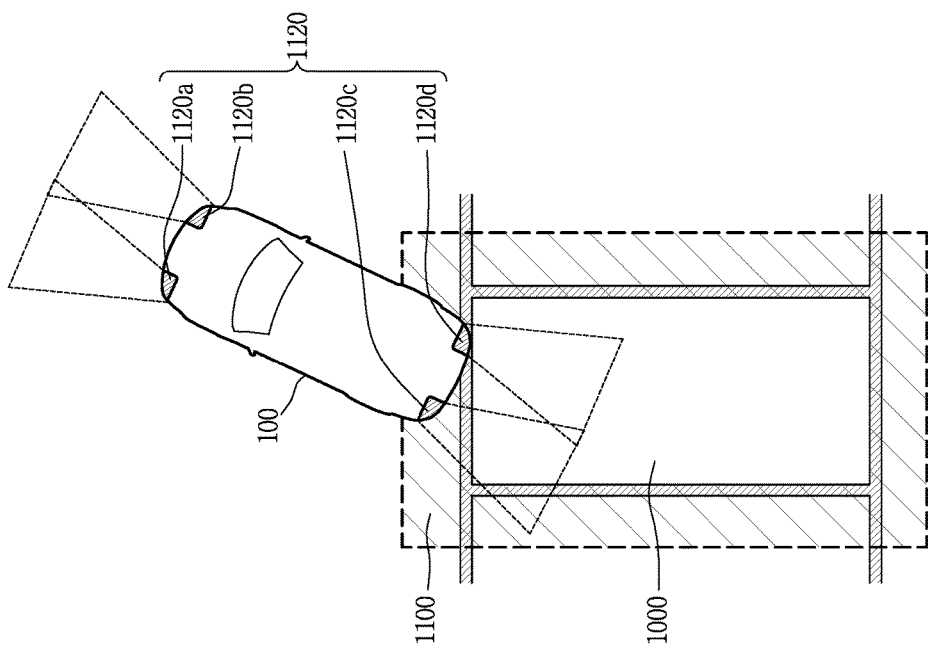
Figure 14A:
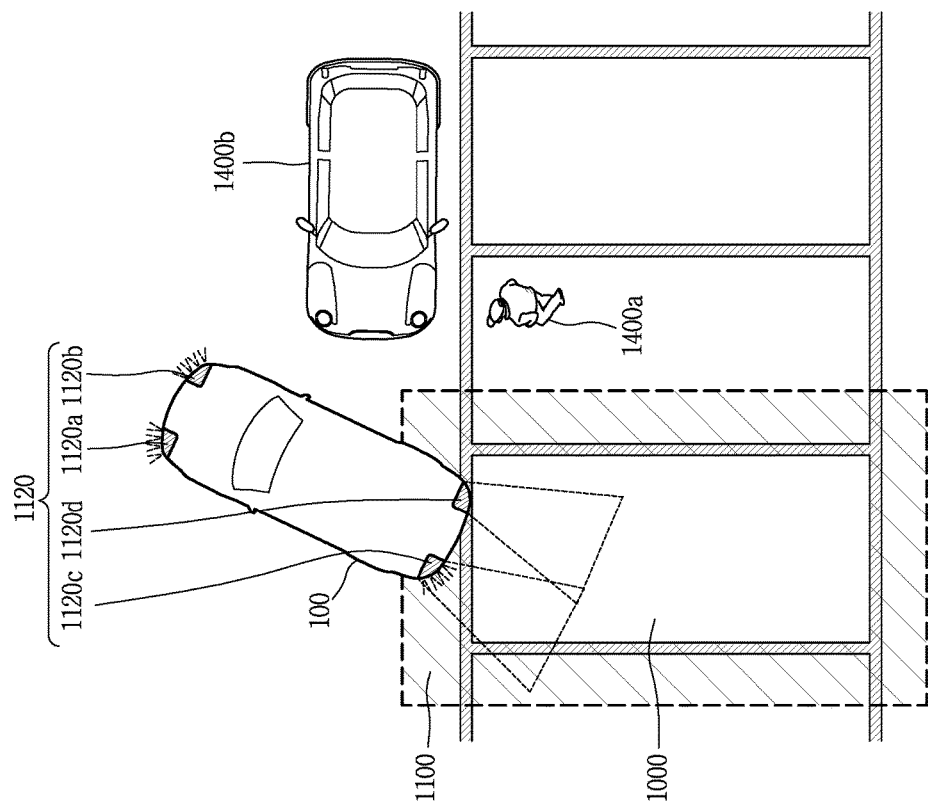

As illustrated in FIG. 14A, when the specific object 1400a or 1400b is sensed, the processor 870 may turn on only the lamps 1120c and 1120d, which have entered the area 1100 adjacent to the parking space 1000 of the plurality of lamps 1120 provided on the vehicle, in the preset manner (e.g., continuous manner).

In this instance, the other lamps 1120a and 1120b which have not entered the adjacent area 1100 yet may be turned on with a predetermined period.

In some implementations, as illustrated in FIG. 14B, when the specific object 1400a or 1400b is not sensed, the processor 870 may turn on all of the plurality of lamps 1120 in the preset manner (e.g., continuous manner).

In this instance, the processor 870 may turn on all of the plurality of lamps in the preset manner (e.g., continuous manner) based on that at least one of the plurality of lamps enters the adjacent area 1100 or the vehicle 100 is switched into an autonomous parking mode or an automatic parking mode.

With the configuration, implementations described herein may turn on (e.g., continuously turn on) only those lamps which have entered the area adjacent to the parking space (or entered the parking space itself) when a person or another vehicle is present near the vehicle during the parking of the vehicle, and may turn on the other lamps with a predetermined period, thereby notifying that the parking is currently executed.

Also, some implementations may increase intensity of light output to surroundings of the vehicle and ambient brightness by turning on (e.g., continuously turning on) all of the lamps, thereby helping parking of the vehicle.

Also, the processor 870 provided in the vehicle control device 800 may sense whether or not a preset object is present within the parking space 1000 or adjacent to the parking space 1000 through the sensing unit 860.

The preset object may be an object that may obstruct a movement of the vehicle during the parking. For example, as illustrated in FIGS. 15A and 15B, the present object may be an obstacle 1500a, another vehicle 1500b and a wall 1500c.

Figure 15B:
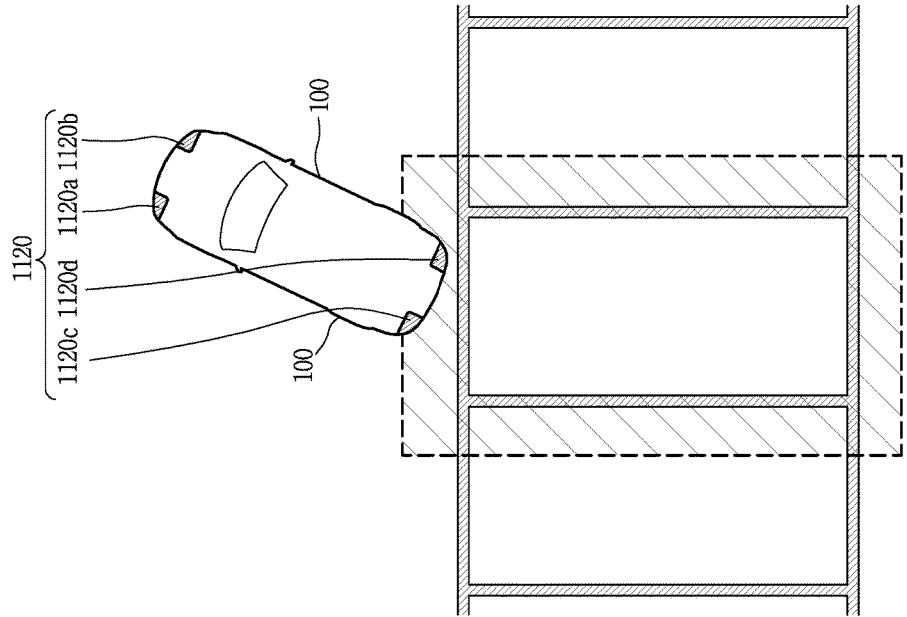
Figure 15A:
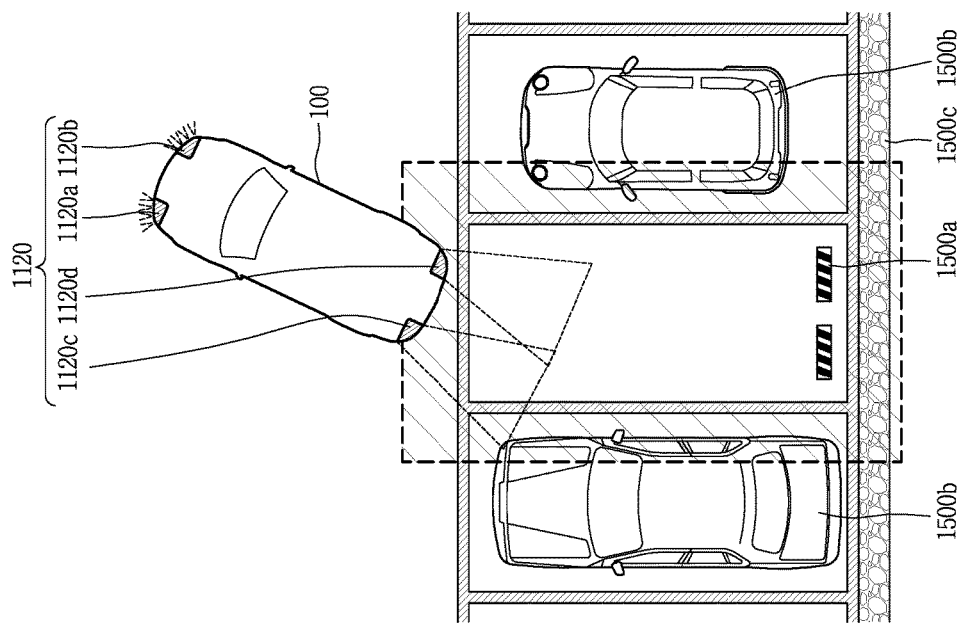

When the preset object is present, the processor 870, as illustrated in FIG. 15A, may turn on the lamp 1120d which has entered the adjacent area 1100 in the preset manner (e.g., continuous manner).

Also, when the preset object is not present, the processor 870, as illustrated in FIG. 15B, may not turn on the lamp entered in the adjacent area 1100 in the preset manner.

Here, that the lamp is not turned on by the present method may refer to that the lamp is turned on according to a type of each lamp and a specific (e.g., unique) lighting method. That is, the head lamp may be turned on according to a user request and the rear lamp may be turned on in response to the brake apparatus being driven.

With the configuration, implementations disclosed herein may help mitigate interference with people near the vehicle due to the lamp being turned on (e.g., continuously turned on) when parking of the vehicle is executed within a limited space. Therefore, ambient brightness can more increase for the driver of the vehicle who is parking the vehicle without trouble.

Also, implementations disclosed herein may not turn on the lamp by the preset manner (e.g., continuously) when the vehicle is likely to pass over the parking space. This may mitigate occurrences where the lamp is activated unnecessarily, potentially bothering people around the vehicle. For example, some implementations may turn on the lamp in the preset manner only when a preset object is detected within the parking space or adjacent to the parking space, and otherwise not automatically turn on the lamp (other than due to other lighting operations that control the lamp) when such a preset object is not detected.

As aforementioned, examples of some implementations have been described focusing on activating at least one of the plurality of lamps provided on the vehicle, in a preset manner, when at least lamp enters an area adjacent to a parking space.

However, implementations are not limited to this. In some implementations, the vehicle may activate, in a preset manner, at least one lamp that enters the parking space itself, rather than an area adjacent to the parking space.

According to some implementations, in some scenarios at least one of the following effects may be obtained.

First, implementations may turn on (e.g., continuously) at least part of a plurality of lamps provided on a vehicle to facilitate acquisition of surrounding information related to an available parking space upon parking the vehicle, thereby increasing an acquisition rate or recognition rate of the surrounding information regarding the available parking space.

Second, implementations may facilitate parking by increasing a recognition rate of a parking space or objects around the vehicle in a manner of continuously turning on at least part of the plurality of lamps upon parking the vehicle, and notify the ongoing parking of the vehicle to people or other vehicles around the vehicle using the other lamps.

Effects of implementations described herein are not necessarily limited to those effects, and other effects may result.

In some implementations, the vehicle control device 800 may be included in the vehicle 100. Also, the operation or control method of the vehicle control device 800 may be equally/similarly applied to the operation or control method of the vehicle 100 (or controller 170).

For example, the control method for the vehicle (or the control method for the vehicle control device 800) may include sensing an entry of the vehicle into an area adjacent to an available parking space through the sensing unit, and activating at least one lamp that has entered the area, in a preset manner (illumination mode).

In some implementations, the plurality of lamps may be provided at different positions of the vehicle, and the vehicle may be configured to turn one or more lamps in the preset manner (illumination mode) in an order in which the lamps have entered the area.

In some implementations, the vehicle may be configured to turn on one or more lamps in the preset manner (illumination mode) even after the lamps have passed through the area adjacent to the parking space and have entered the parking space.

Here, the preset manner (illumination mode) may be a manner of continuously turning on the lamp, irrespective of a type of each lamp and a specific lighting method of each lamp.

The adjacent area may be an area which exists within a predetermined distance from the parking space.

Each of the steps may be executed by the controller 170 provided in the vehicle 100 as well as the vehicle control device 800.

Also, every function, configuration or control method executed by the vehicle control device 800 can be executed by the controller 170 provided in the vehicle 100. That is, every control method disclosed herein may be applied to the control method for the vehicle and even to the control method for the control device.

Implementations described herein may be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include, for example, the processor 870 of the control device 800 or the controller 170. Therefore, it should also be understood that the above-described implementations are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device, comprising:
   a plurality of lamps provided on a vehicle;
   a sensing unit configured to sense information related to the vehicle; and
   at least one processor configured to:
      based on a determination, through the sensing unit, that at least a portion of the vehicle has entered a first area that is adjacent to an available parking space, activate, in a first illumination mode, at least one lamp among the plurality of lamps that has entered the first area that is adjacent to the available parking space,
   wherein the at least one processor is further configured to:
      based on a first lamp among the plurality of lamps having entered the first area, activate, in the first illumination mode, the first lamp among the plurality of lamps, and
      based on a second lamp among the plurality of lamps having entered the first area after the first lamp has entered the first area, activate, in the first illumination mode, the second lamp together with the first lamp.

2. The vehicle control device of claim 1, wherein the plurality of lamps are provided at different positions of the vehicle, and
   wherein the at least one processor is configured to activate, in the first illumination mode, the at least one lamp that has entered the first area by:
      activating, in the first illumination mode, two or more lamps among the plurality of lamps in an order in which the two or more lamps have entered the first area that is adjacent to the available parking space.

3. The vehicle control device of claim 1, wherein the at least one processor is further configured to maintain the at least one lamp in the first illumination mode after the at least one lamp has passed through the first area and has entered the available parking space.

4. The vehicle control device of claim 1, wherein the first illumination mode comprises turning on the at least one lamp in a continuous manner.

5. The vehicle control device of claim 1, wherein the first area that is adjacent to the available parking space comprises a region that is within a first distance from at least one boundary of the available parking space.

6. The vehicle control device of claim 1, wherein the at least one processor is further configured to:
   based on at least one first lamp among the plurality of lamps having entered the first area, and based on at least one second lamp among the plurality of lamps not having entered the first area, activate the at least one first lamp in the first illumination mode, and activate the at least one second lamp in a second illumination mode different from the first illumination mode.

7. The vehicle control device of claim 1, wherein the at least one processor is further configured to:
   based on at least one first lamp among the plurality of lamps having entered the first area, activate at least one first lamp in the first illumination mode according to a direction in which the vehicle enters the available parking space.

8. The vehicle control device of claim 7, wherein the at least one processor is configured to activate the at least one first lamp in the first illumination mode according to the direction in which the vehicle enters the available parking space by:
   continuously turning on the at least one first lamp that is provided on a front side of the vehicle based on the vehicle entering the first area adjacent to the available parking space in a forward direction starting with the front side of the vehicle; and
   continuously turning on the at least one first lamp that is provided on a rear side of the vehicle based on the vehicle entering the first area adjacent to the available parking space in a reverse direction starting from the rear side of the vehicle.

9. The vehicle control device of claim 7, wherein the at least one processor is configured to activate the at least one first lamp in the first illumination mode according to the direction in which the vehicle enters the available parking space by:
   continuously turning on the at least one lamp that is provided on a first side of the vehicle that is closest to the parking space among a plurality of sides of the vehicle, based on the vehicle executing a parallel parking operation into the available parking space.

10. The vehicle control device of claim 9, wherein the at least one processor is further configured to:
    based on the vehicle executing the parallel parking operation into the available parking space, continuously turn on at least one second lamp that has not yet entered the first area adjacent to the available parking area, the at least one second lamp provided on the first side of the vehicle that is closest to the parking space.

11. The vehicle control device of claim 1, wherein at least one of the plurality of lamps is configured to vary a light output direction, and
    wherein the at least one processor is further configured to control the light output direction of the at least one of the plurality of lamps to be directed to a center location of the available parking space, based on the at least one of the plurality of lamps being activated in the first illumination mode.

12. The vehicle control device of claim 1, wherein the at least one processor is further configured to:
    sense, through the sensing unit, whether a first object is present within a first distance from the vehicle;

based on a first determination that the first object is present within the first distance from the vehicle, control the plurality of lamps in a first control mode; and
based on a second determination that the first object is not present within the first distance from the vehicle, control the plurality of lamps in a second control mode.

13. The vehicle control device of claim 12,
wherein the at least one processor is configured to, based on the first determination that the first object is present within the first distance from the vehicle, control the plurality of lamps in the first control mode by:
turning on all of the plurality of lamps in the first illumination mode, and
wherein the at least one processor is configured to, based on the second determination that the first object is not present within the first distance from the vehicle, control the plurality of lamps in the second control mode by:
turning on, in the first illumination mode, only a subset of the plurality of lamps that has entered the first area adjacent to the available parking space.

14. The vehicle control device of claim 1, wherein the at least one processor is further configured to:
sense, through the sensing unit, whether a first object is present within the available parking space or is present adjacent to the available parking space;
based on a first determination that the first object is present within the available parking space or is present adjacent to the available parking space, activate, in the first illumination mode, at least one lamp that has entered the first area adjacent to the available parking space; and
based on a second determination that the first object is not present within the available parking space and is not present adjacent to the available parking space, not activate, in the first illumination mode, the at least one lamp that has entered the first area adjacent to the available parking space.

15. A vehicle comprising the vehicle control device according to claim 1.

16. A method for controlling a vehicle having a plurality of lamps, the method comprising:
sensing that at least a portion of the vehicle has entered a first area that is adjacent to an available parking space; and
based on sensing that at least the portion of the vehicle has entered the first area that is adjacent to the available parking space, activating, in a first illumination mode, at least one lamp among the plurality of lamps that has entered the first area that is adjacent to the available parking space,
wherein the method further comprises:
based on sensing that a first lamp among the plurality of lamps has entered the first area, activating, in the first illumination mode, the first lamp among the plurality of lamps, and
based on sensing that a second lamp among the plurality of lamps has entered the first area after the first lamp has entered the first area, activating, in the first illumination mode, the second lamp together with the first lamp.

17. The method of claim 16, wherein the plurality of lamps are provided at different positions of the vehicle, and
wherein activating, in the first illumination mode, the at least one lamp that has entered the first area comprises:
activating, in the first illumination mode, two or more lamps among the plurality of lamps in an order in which the two or more lamps have entered the first area that is adjacent to the available parking space.

18. The method of claim 16, further comprising:
maintaining the at least one lamp in the first illumination mode after the at least one lamp has passed through the first area and has entered the available parking space.

19. The method of claim 16, wherein the first illumination mode comprises turning on the at least one lamp in a continuous manner.

20. The method of claim 16, wherein the first area that is adjacent to the available parking space comprises a region that is within a first distance from at least one boundary of the available parking space.

* * * * *